United States Patent
Brooks et al.

[15] 3,670,853
[45] June 20, 1972

[54] DISC BRAKE WITH PARKING BRAKE

[72] Inventors: Frank W. Brooks; Thomas D. Naismith, both of Dayton, Ohio

[73] Assignee: General Motors Corporation, Detroit, Mich.

[22] Filed: Jan. 26, 1971

[21] Appl. No.: 109,790

[52] U.S. Cl. ........................................................ 188/72.6
[51] Int. Cl. .................................................... F16d 55/00
[58] Field of Search ..................... 188/72.6, 72.7, 71.7, 71.8, 188/106 F

[56] References Cited

UNITED STATES PATENTS 3,425,519  2/1969  Frigger .............................. 188/72.6

*Primary Examiner*—Richard E. Aegerter
*Attorney*—W. E. Finken and D. D. McGraw

[57] ABSTRACT

A disc brake caliper includes a hydraulically actuated piston, a frictional locking device comprising a pair of apertured locking plates closely surrounding the piston at a point between the caliper bore and the brake shoe, and a cam device which upon actuation biases the locking plates relative the piston so that the piston is frictionally gripped by the apertured locking plates and carried toward the rotor to actuate the brake independently of hydraulic piston actuation. The piston is not gripped until the cam device is actuated so that the frictional locking device automatically compensates for lining wear.

3 Claims, 8 Drawing Figures

PATENTED JUN 20 1972

INVENTORS
Frank W. Brooks &
BY Thomas D. Naismith

D.D. McGraw
ATTORNEY

INVENTORS
Frank W. Brooks &
BY Thomas D. Naismith
D. D. McGraw
ATTORNEY

DISC BRAKE WITH PARKING BRAKE

The invention relates to a disc brake caliper assembly and more particularly to a combination hydraulic actuating means and an automatically adjustable mechanical actuating means.

It is desirable in an automotive disc brake assembly to provide hydraulic actuation for service braking and mechanical actuation for emergency and parking braking. It is also desirable that such a combination brake actuating means be automatically adjustable to compensate for brake lining wear.

The disc brake caliper of the invention includes a piston slidable in the caliper bore and which upon introduction of pressurized fluid forces an abutting brake pad assembly into braking engagement with the disc. The reaction forces are transferred through the caliper to force the opposing brake shoe into engagement with the other side of the disc. The portion of the caliper in which the piston is slidable is spaced from the directly actuated brake pad so that a considerable length of the piston extends between the caliper bore and the directly actuated brake pad.

The invention includes a frictional locking device which is engageable with the outer surface of the piston during operator actuation of the mechanical actuating means but which is frictionally released from the piston when the mechanical brake is not actuated so that the piston may be freely actuated hydraulically. Inasmuch as the friction locking device does not grip the piston until the brakes are mechanically actuated, the mechanical actuating mechanism automatically compensates for lining wear.

Figure 1:
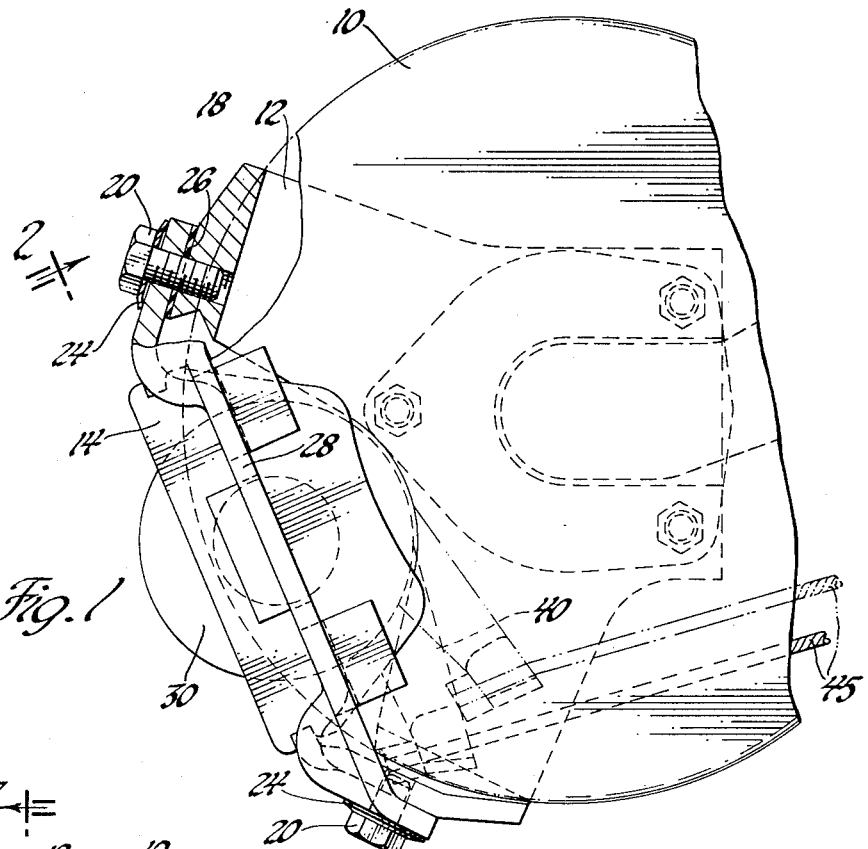
FIG. 1 is an elevational view of a disc brake assembly incorporating the preferred embodiment of the invention and having parts broken away and in section.
Figure 2:
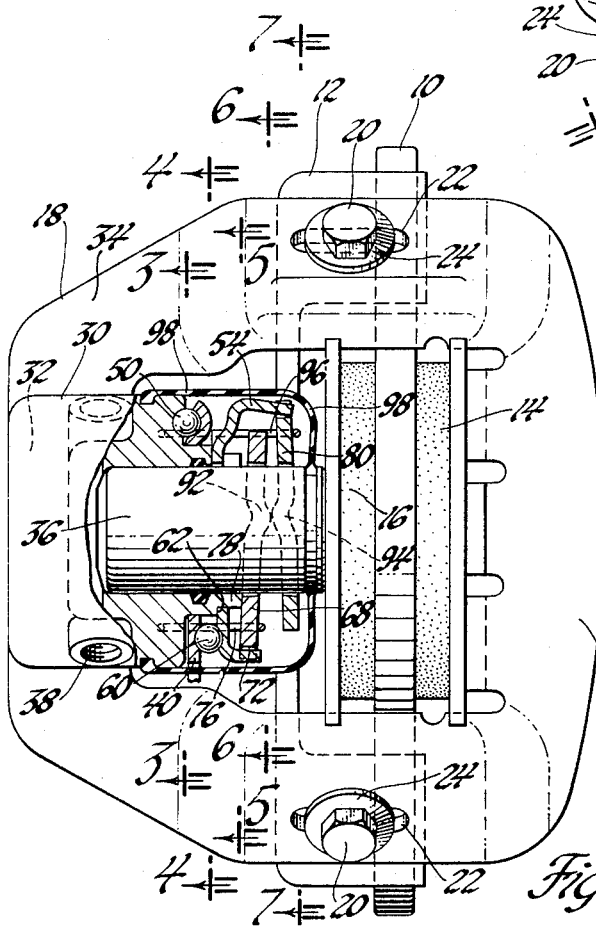
FIG. 2 shows a view of the invention taken in the direction of arrows 2—2 of FIG. 1 and having parts broken away and in section.

Referring to FIGS. 1 and 2 the disc brake assembly includes a rotor 10 which is attached to the vehicle wheel so as to rotate therewith. A bracket 12 is formed as an integral part of a suspension member or may be attached thereto but is in any case stationary in relation to the rotor. Brake pad assemblies 14 and 16 are located on opposite sides of the rotor 10. A bridge 18, in the form of a closed loop, is supported on the bracket 12 and is attached thereto by two shoulder bolts 20 which pass through axially extending slots 22 in the bridge so as to permit axial movement of the bridge. A bowed spring washer 24 situated between the head of bolt 20 and the bridge 18 and a plastic shim 26 situated between the surfaces of the bridge 18 and bracket 12 provide an anti-friction and anti-rattle feature. Leg 28 of bridge 18 engages the brake pad assembly 14. A hydraulic cylindrical body 30 includes on its rearward end a slot 32 by which the cylinder body 30 is mounted on leg 34 of bridge 18. The engagement of slot 32 on leg 34 of bridge 18 restrains the cylinder body 30 in a radial direction and in the axial direction away from rotor 10. The face of cylinder body 30 is spaced from the brake pad assembly 16. A piston 36 is sealingly slideable in the cylinder body and extends therefrom into engagement with the brake pad assembly 16. The bridge 18, cylinder body 30, and piston 36 cooperate to form a caliper which upon introduction of hydraulic pressure at fluid inlet port 38 of the cylinder body 30 moves the brake pad assembly 16 into braking engagement of one side of the rotor 10 and the reaction force transferred through the bridge 18 forces pad assembly 14 into braking engagement of the other side of rotor 10. Bridge 18 moves axially to accommodate lining wear of the brake pad assembly 14.

Figure 3:
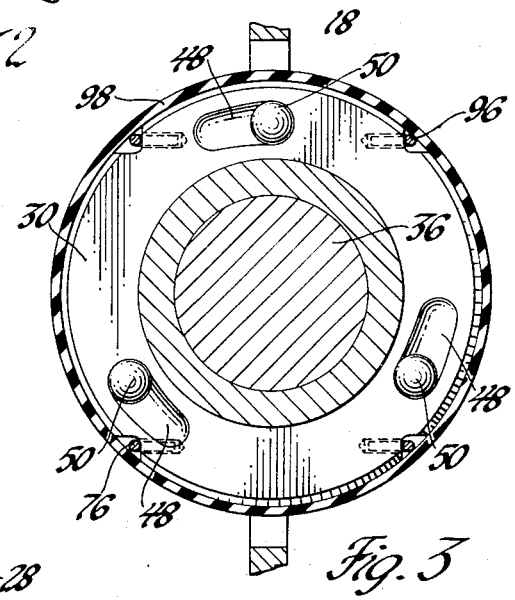
FIG. 3 is a sectional view taken in the direction of arrows 3—3 of FIG. 2.
Figure 4:
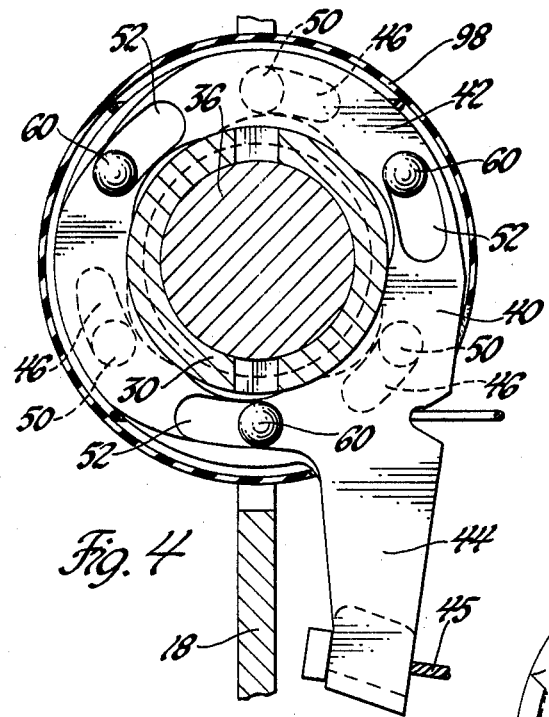
FIG. 4 is a sectional view taken in the direction of arrows 4—4 of FIG. 2.

The mechanical brake actuating mechanism includes a frictional gripping device which attaches itself to the outer surface of the piston when an operator actuable cam device moves the frictional locking device toward the brake rotor 10. A lever 40, best shown in FIG. 4, includes an integrally formed ring 42 which surrounds the piston 36 and an arm 44 to which a cable 45 is attached and is in turn connected to an operator actuable lever mechanism. Three equally circumferentially spaced ball ramps 46 are formed on the ring 42 and face the cylinder body 30. Three mating ball ramps 48 are formed on the face of cylinder body 30 as shown in FIG. 3. Three balls 50 are located between lever 40 and cylinder body 30 in the ball ramps 46 and 48 formed respectively thereon. A second set of ball ramps 52 on ring 42 face toward the rotor 10.

Figure 5:
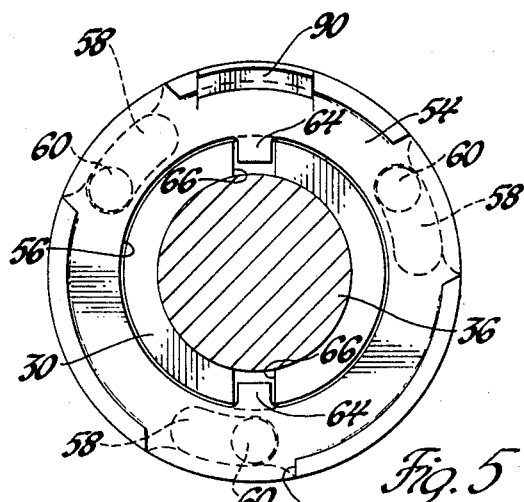
FIG. 5 is a sectional view taken in the direction of arrows 5—5 of FIG. 2.

A cup 54, shown in FIG. 5, is situated intermediate the lever 40 and the brake pad assembly 16. An aperture 56 in the bottom of cup 54 allows the piston 36 to pass freely over a portion of cylinder body 30. Three ball ramps 58 are formed on the bottom of cup 54 and face the lever 40. Three balls 60 are situated between cup 54 and lever 40 and are seated in the ball ramps 52 and 58. A stop surface 62, shown in FIG. 2, is formed on the face of cylinder body 30 and limits the movement of cup 54 away from rotor 10. A pair of tangs 64 which extend radially inward from the cup 54 engage mating slots 66 in the cylinder body 30 so as to permit axial movement of the cup 54 but prevent it from rotating.

Figure 6:
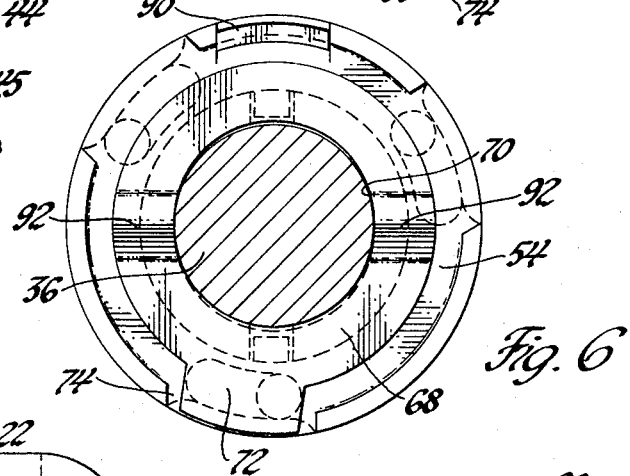
FIG. 6 is a sectional view taken in the direction of arrows 6—6 of FIG. 2.

A generally disc shaped locking plate 68, shown in FIG. 6, has a central aperture 70 and is slidably fitted on the piston 36. The walls of aperture 70 closely surround the piston 36 so that a slight cocking of the locking plate 68 relative to the axis of the piston 36 causes the locking plate 68 to frictionally grip the piston 36. A tang 72 extends radially from the locking plate 68 and fits into a slot 74 formed in the wall of cup 54. A spring clip 76, shown in FIG. 2, is seated at the cylinder body 30 and engages the locking plate 68 adjacent the tang 72 thus urging the cup 54 into engagement with stop surface 62 and urging locking plate 68 into engagement of a second stop surface 78 formed on the face of cylinder body 30. When the cup 54 and the locking plates 68 are seated at their respective stop surfaces, the locking plate 68 is angled relative to piston 36 so that piston 36 slides freely through the aperture 70.

A second generally disc shaped locking plate 80 includes a central aperture 82 and is slidably fitted onto piston 36 adjacent the locking plate 68. A pair of tangs 84 and 86 extend from the locking plate 80 forming therebetween a notch 88. A tab 90 extending axially from the wall of cup 54 is engaged in notch 88 of locking plate 80. Slot 74 and tab 90 of cup 54 are circumferentially spaced nearly equally apart from each other on the cup 54. The locking plate 68 and the locking plate 80 pivotally engage each other at a pair of bosses 92 and a pair of bosses 94 formed respectively thereon. The bosses 92 are formed on locking plate 68 at diametrically opposed points. Likewise, the pair of bosses 94 on locking plate 80 are diametrically opposed. The generally C-shaped spring clip 96 is seated on cylinder body 30 and engages locking plate 80 adjacent the notch 88 thereof. The spring clip 96 thus holds cup 54 in engagement of stop surface 62 and holds locking plate 80 in engagement with cup 54. The engagement of bosses 94 of locking plate 80 with bosses 92 of locking plate 68 cocks locking plate 80 relative to piston 36 so as to permit the piston 36 to be freely slidable through the aperture 82 of locking plate 80. Inasmuch as the piston 36 is freely slidable through the apertures of locking plates 68 and 80, the piston 36 may be hydraulically actuated without interference. A dirt seal 98 is seated at piston 36 and at cylinder body 30 and surrounds the mechanical brake actuating mechanism.

In operation, operator actuation of a lever mechanism tensions the cable 45 attached to lever 40. The consequent rotation of lever 40 causes the balls 50 and 60 to ride up the ball ramps 46, 48, 52 and 58 so that the cup 54 is moved axially toward the rotor 10. This axial movement of the cup 54 lifts locking plate 68 from engagement with stop surface 78 and the spring clip 76 causes the locking plate 68 to pivot about its engagement with cup 54 until the walls of aperture 70 frictionally grip the piston 36. Spring clip 96 causes the locking plate 80 to pivot about its point of engagement with cup 54 until the walls of aperture 82 frictionally grip the piston 36. Subsequent axial movement of cup 54 induced by progressive rotation of lever 40 causes movement of the cup 54, the locking plates 68 and 80, and piston 36 toward the rotor 10 thus forcibly carrying the brake pad assembly 16 into braking engagement with the rotor 10. The reaction force is transmitted through the bridge 18 to force brake pad assembly 14 into braking engagement with the other side of rotor 10.

Relaxation of the cable tension permits the spring clips 76 and 96 to return the locking plates 68 and 80, piston 36 and cup 54 axially away from the rotor 10 as the balls ride back down the ball ramps. When the cup 54 again assumes its rest position engaging stop surface 62 and the locking plate 68 engages the second stop surface 78, the locking plates 68 and 80 are again cocked to their freely slidable positions relative the piston 36.

The disc brake assembly automatically compensates for lining wear. As the brake linings wear during the many hydraulic brake actuations experienced in the course of normal driving, the piston 36 returns into the cylinder body 30 to a progressively lesser extent by an amount corresponding to the lining wear so that the brake pad assemblies 14 and 16 are maintained in close relationship with rotor 10. Inasmuch as the locking plates 68 and 80 do not engage the piston 36 until the lever 40 is actuated, the point of the frictional gripping on the piston 36 is determined by the extent to which the linings have worn. Thus the mechanical actuating mechanism is capable of actuating the brakes regardless of the extent to which the linings have worn.

Figure 8:
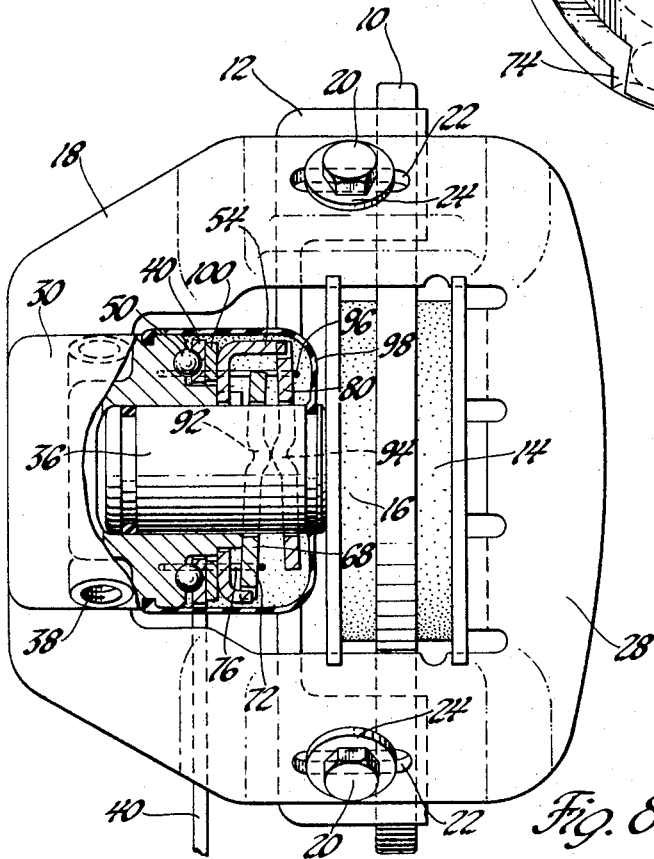
FIG. 8 is a plan view of a second embodiment of the invention having parts broken away in section.
Figure 7:
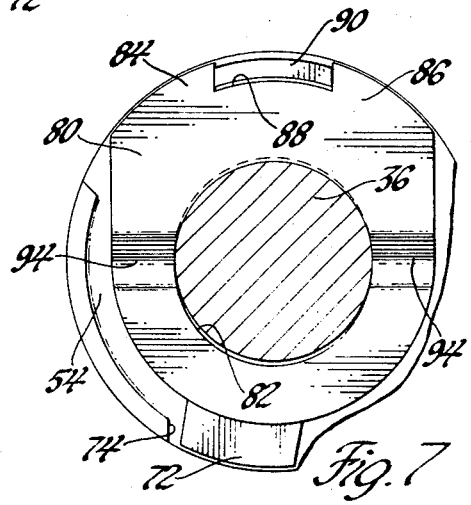
FIG. 7 is a sectional view taken in the direction of arrows 7—7 of FIG. 2.

A second embodiment of the invention is shown in FIG. 8. The embodiment of FIG. 8 is identical with the preferred embodiment of FIG. 2 with the exception that an annular thrust washer 100 is situated between lever 40 and cup 54 to minimize friction losses between the rotating lever 40 and the rotationally stationary cup 54. Thus, in this embodiment the balls 50 cooperate with the ball ramps 46 and 48 to impart axial thrust to the cup 54.

What is claimed is:

1. A caliper type disc brake for a vehicle wheel comprising:
a rotor fixed for rotation with the wheel;
first and second brake shoes positioned on opposite sides of the rotor;
a caliper extending over the periphery of the disc and including a reaction leg on one side of the rotor engaging the first brake shoe and another leg on the other side of the rotor and spaced from the second shoe;
a piston sealingly slidable in the another leg and engaging the second brake shoe for moving the brake shoes into engagement with the rotor upon hydraulic actuation of the piston;
locking means frictionally gripping the outer surface of the piston when the locking means is moved toward the rotor;
and operator actuable means effective to forcibly move the locking means toward the rotor whereby the locking means frictionally engages the piston to force the brake shoes into braking engagement of the rotor independently of hydraulic actuation.

2. A vehicle disc brake assembly comprising:
a rotor fixed to the vehicle wheel for rotation therewith;
first and second brake shoes positioned on opposite sides of the rotor;
a caliper extending over the periphery of the disc and having a reaction leg on one side of the rotor engaging the first brake shoe and another leg on the other side of the rotor and spaced from the second brake shoe;
a piston sealingly slidable in the another leg and engaging the second brake shoe for moving the brake shoes into engagement with the rotor upon hydraulic actuation of the piston;
a cup located between the another leg and the second brake shoe and having an apertured bottom through which the piston may move freely, the walls of the cup extending axially toward the rotor;
a pair of locking plates located between the cup and the second brake shoe, each locking plate being apertured so as to closely surround the piston, and each having a minor circumferential portion contacting the wall of the cup, the contacting portions of the respective locking plates being spaced circumferentially about the axis of the piston from one another, whereby movement of the cup toward the rotor causes the walls of the locking plate apertures to frictionally engage the piston;
and operator actuable means acting between the another leg and the cup and effective to forcibly move the cup toward the rotor whereby the locking plates frictionally engage the piston to move the brake shoes into braking engagement of the rotor independently of a hydraulic actuation.

3. A vehicle disc brake assembly comprising:
a rotor fixed to the vehicle wheel for rotation therewith;
first and second brake shoes positioned on opposite sides of the rotor;
a caliper extending over the periphery of the disc and having reaction leg on one side of the disc engaging the first brake shoe and another leg on the other side of the rotor and spaced from the second brake shoe;
a piston sealingly slidable in the another leg and engaging the second brake shoe for moving the brake shoes into engagement with the rotor upon hydraulic actuation of the piston;
a cup located between the another leg and the second brake shoe and having an apertured bottom through which the piston may move freely, the walls of the cup extending axially toward the rotor;
a pair of apertured locking plates closely surrounding the piston and located side by side thereon intermediate the cup and the second brake shoe, a portion of each locking plate extending into engagement with the walls of the cup, the cup contacting portions of each lever being spaced circumferentially about the axis of the piston from one another, each plate having an abutment portion thereon located generally intermediate the contacting portion and the diametrically opposed portion of the plate, and the abutment portion of each locking plate abutting the abutment portion of the other;
operator actuable means effective to forcibly move the cup toward the rotor whereby the locking plates are biased relative the piston so that the walls of the locking plate apertures frictionally engage the piston to force the brake shoes into braking engagement with the rotor independently of hydraulic actuation;
stop surfaces on the another leg of the caliper engageable with the cup and the locking plate closest thereto;
spring means engaging the locking plates and urging the locking plates and the abutting cup away from the rotor whereby when the cup is engaging the stop surface the next closest locking plate is also engaging the stop surface and pivoted thereon to a non-gripping position relative to the piston and causing the other locking plate through the abutment of the respective abutment surfaces of the locking plates to pivot to a non-gripping position relative to the piston so that the piston may move freely for hydraulic actuation.

* * * * *